(12) United States Patent
Volpi

(10) Patent No.: US 10,974,332 B2
(45) Date of Patent: Apr. 13, 2021

(54) CURRENT FEEDING DEVICE FOR WIRE ELECTRICAL DISCHARGE MACHINING

(71) Applicant: Agie Charmilles SA, Losone (CH)

(72) Inventor: Franco Volpi, Tegna (CH)

(73) Assignee: Agie Charmilles SA

( * ) Notice: Subject to any disclaimer, the term of this patent is extended or adjusted under 35 U.S.C. 154(b) by 0 days.

(21) Appl. No.: 16/385,613

(22) Filed: Apr. 16, 2019

(65) Prior Publication Data

US 2019/0366457 A1 Dec. 5, 2019

(30) Foreign Application Priority Data

Jun. 1, 2018 (EP) .................................. 18175477

(51) Int. Cl.
*B23H 7/10* (2006.01)
*H01R 39/64* (2006.01)

(52) U.S. Cl.
CPC ............. *B23H 7/107* (2013.01); *H01R 39/64* (2013.01)

(58) Field of Classification Search
CPC .......... B23H 7/10; B23H 7/102; B23H 7/107; B23H 7/101; H01R 39/64
USPC ............................ 439/11, 17, 19; 219/69.12
See application file for complete search history.

(56) References Cited

U.S. PATENT DOCUMENTS

| | | | | |
|---|---|---|---|---|
| 4,263,116 A | * | 4/1981 | Inoue ....................... | B23H 7/10 204/224 M |
| 4,422,918 A | * | 12/1983 | Inoue ....................... | B23H 7/10 204/206 |
| 4,733,038 A | | 3/1988 | Girardin | |
| 4,803,326 A | * | 2/1989 | Kiyoshi ................... | B23H 7/02 204/206 |
| 4,814,572 A | * | 3/1989 | Aso ........................ | B23H 7/102 219/69.12 |
| 5,057,663 A | * | 10/1991 | Kinoshita .............. | B23H 7/102 219/69.12 |
| 5,288,965 A | * | 2/1994 | Gambin ................... | B23H 7/10 219/69.12 |

(Continued)

FOREIGN PATENT DOCUMENTS

| | | |
|---|---|---|
| CN | 203 509 257 U | 4/2014 |
| EP | 1 523 086 A1 | 4/2005 |

(Continued)

OTHER PUBLICATIONS

Extended European Search Report for Application No. EP 18 17 5477 dated Nov. 19, 2018 (7 pages).

*Primary Examiner* — Abdullah A Riyami
*Assistant Examiner* — Marcus E Harcum
(74) *Attorney, Agent, or Firm* — Harness, Dickey & Pierce, P.L.C.

(57) ABSTRACT

The present invention is directed to a current feeding device for the supply of electrical current to a wire electrode traveling in an electro-erosion machine during the machining operation. The current feeding device comprising: a rotary electrically conductive body which is in contact with the wire electrode; at least one bearing for supporting the rotary electrically conductive body at one side; and a brush for electrically contacting the rotary electrically conductive body and for supporting the rotary electrically conductive body at the other side of the body and opposite side to the bearing. The brush is at the rotary axis of the rotary electrically conductive body.

13 Claims, 5 Drawing Sheets

(56) References Cited

U.S. PATENT DOCUMENTS

2006/0065637 A1* 3/2006 Kita ..................... B23H 7/107
                                                        219/69.12
2014/0319101 A1* 10/2014 Nakajima ............. B23H 7/108
                                                        219/69.12

FOREIGN PATENT DOCUMENTS

| EP | 2 892 673 A1 | 7/2015 |
|---|---|---|
| JP | S60-123223 A | 7/1985 |
| JP | S62-044320 A | 2/1987 |
| JP | 2001-341031 A | 12/2001 |

* cited by examiner

CURRENT FEEDING DEVICE FOR WIRE ELECTRICAL DISCHARGE MACHINING

CROSS-REFERENCE TO RELATED APPLICATIONS

This application claims the benefit and priority of European Application No. 18 175 477.1, filed Jun. 1, 2018. The entire disclosure of the above application is incorporated herein by reference.

FIELD OF THE INVENTION

The present invention relates to a current feeding device for supplying electrical current to a wire electrode on a wire electrical discharge machine.

BACKGROUND OF THE INVENTION

Wire electrical discharge machines (WEDM) use a traveling wire electrode as a tool to cut a desired contour into a workpiece with high accuracy. The workpiece is cut by an electrical discharge process in which electrical discharges occur between the wire electrode and the conductive work piece. This process wears the wire which is thus continuously renewed. The new wire electrode is stored on a wire spool and travels under mechanical tension through a wire circuit of the WEDM. In the machining area the wire electrode is precisely guided by means of an upper and a lower wire guiding head, each wire guiding head comprising a flushing nozzle, several wire guides and at least one current feeder. The current is transmitted to the wire electrode by means of the current feeders.

The current feeders used in practice are stationary, so that the traveling wire slides over the electric contact. Typically the current feeder is made of a hard material such as tungsten carbide, it has a cylindrical, oval or prism shape, with the axis normally being perpendicular to the traveling wire. They can be displaced axially or rotated such as to expose a new unworn area of the current feeder surface. For instance a prism shaped current feeder having four sides, and being axially displaceable 8 times may thus be used at up to 32 different positions. The overall lifetime of the feeder is thus considerable, but due to the wearing the current feeder must be frequently repositioned. Generally, in the upper wire guiding head a first pre-guide is mounted ahead of the current feeder in the wire traveling direction, and a second pre-guide is mounted shortly after the current feeder. These pre-guides are mounted such that in operation the wire is forced against the current feeder due to the wire tension. The stationary current feeders are subject to mechanical friction of the traveling wire which continuously slides over the feeders. The new wire electrode passes through the upper wire guide head where some wear is produced on the current feeder due to friction and the micro-asperities present on the wire surface. The lower current feeder which lies below the machining area is more prone to mechanical wear, because the wire surface is covered with craters, and work piece particles which are removed by the WEDM process may be transferred to the traveling wire, so that the wire becomes abrasive.

During the WEDM process the electrical discharges are supposed to occur between the wire and the workpiece, but undesired discharges due to unstable contact may occur at the interface area between wire and current feeders. In the lower head the wire is laced with craters, roughened by the WEDM process, so that instability in the current transfer to wire may be even worse. Further the energy is transferred impulse-wise over a thin line contact interface area, so that Joule-heating is concentrated in the contact area.

Thus the current feeders are subject to combined thermo-mechanical stress, which wears the feeders and limits the lifetime. Wearing of the current feeder generates a groove in the feeder; the risk of wire breaking increases with the formation of such grooves. In order to keep the machine operational the operator has to reposition the current feeder regularly, or replace it once all positions of the feeder are worn.

Another problem is given by the braking force generated by the sliding friction over the stationary current feeders. The breaking force is proportional to frictional coefficient and to the contact force, which is the force component of the wire tensioning force acting against the current feeders.

Several attempts have been made to solve some of the previously mentioned wearing and related problems. The following references all include a rotary current feeding element through which the machining current is supplied to the wire electrode.

In JP62044320A it has been proposed to use a rotary current feeding element to stabilize the current conduction to the wire. The wire is bended in a wire path formed by a rotary power conduction roller and the pressure contact rollers in order to improve the contact force between wire and current feeder body and to increase the contacting area. A motor drives the power conduction roller which is supported on an axis. A current feeder brush 18 urges laterally against the contact roller.

In US4263116A it has been proposed to use a first rotatable wheel coupled with a second rotatable wheel, and means to urge the first and second rotatable wheel towards each other by which the wire electrode is squeezed between the two rotatable wheels. Here the brush is in contact with the axle of the rotatable wheel to transmit the machining current to the wire electrode.

U.S. Pat. No. 4,422,918A discloses a current feeding assembly comprising a pair of coplanar current feeding wheels rotatable about their respective shafts, and urging towards each other, with the wire electrode pinched in between. A brush is electrically connectable to said wheels for conducting the current to the wire. A casing is provided in which the sliding brush 16 is retained and made to urge laterally against the wheel.

JP60123223A discloses another rotary current feeding assembly, in which a disk shaped conductive block is coupled to a shaft and supported by a plurality of ball bearings. The bearings are separated from the disk shaped conductive block by means of a gasket 56. The machining current is transmitted to the shaft by means of a mercury contact which is nearly frictionless.

Lastly U.S. Pat. No. 4,733,038 discloses a current feeding assembly with a roller type electrical conducting part which is freely rotatable. The roller includes a shaft which extends into a cavity filed with a conductive liquid such as mercury or the like. The machining current is supplied to the wire through said conductive liquid, to the shaft and the roller. The roller shaft is supported by means of sapphire bearing members, i.e. jewel bearings.

The cited documents show possible solutions for a rotary current feeder for use in WEDM's, however with certain of these solutions an unhindered rotation of the roller is not guaranteed, due to the friction of a gasket, or the friction of a badly placed contact brush, or the bearing friction. With certain of these solutions the current flows through a supporting shaft of the rotary current feeder and the bearing is subject to erosion due to discharges occurring in the bearing. Also, during the wire cutting the machining area is exposed to the erosion particles, which may deposit within the wire guiding heads, and may increase the friction and compromise the operability. This problem may occur in particular with fine wires or in general in case of low wire electrode tensioning force. If the continuous rotation is not guaranteed the current supply is unstable and thus unreliable, in which case would be preferable to have a conventional sliding contact. A solution which includes a motor for the rotation of the current feeder would ensure the reliable rotation, but this is not preferable because of the additional means required, costs, and because of the additional space needed.

The current feeder device must be mounted in the wire guiding heads which have a limited size, and the current feeder must be as near as possible to the workpiece, thus a rotary current feeding assembly must be comparably small. Lastly, the current feeder must be easily mountable and dismountable for quick replacement, at its end of life.

A solution including a liquid contact such as mercury is not considered to be viable and thus excluded a priori, because of the technical complication, because of the required space, because of the difficulties in case of the replacement of worn parts and because of the consequences in case of failure.

Thus there is a need for a viable solution which is small enough to be installed in a wire guiding head, which has low wear, which has low friction and is thus reliable, and which is easily mountable and dismountable.

SUMMARY OF THE INVENTION

It is an aspect of this invention to provide an improved current feeding device for the reliable supply of electrical current to a wire electrode. In particular, it is an objective to provide a current feeding device having low friction and low wear, which has a small dimension and is easily mountable and dismountable.

According to the preferred embodiment of the present invention a current feeding device for the supply of electrical current to a wire electrode traveling in an electro-erosion machine during the machining operation comprises: a rotary electrically conductive body which is in contact with the wire electrode, the rotary electrically conductive body being supported at one side by at least one bearing, in particular jewel or sapphire, and on the opposite side of the bearing by a brush. The brush is used for electrically contacting the rotary electrically conductive body, such that the electrical current can be transmitted to the rotary electrically conductive body for the supply of electrical current to the wire electrode. Different types of brush are suitable for this application, for example, carbon brush, microfiber brush and spring type brush. In the mounted state, the brush is located at the other side of the rotary electrically conductive body, opposite to the at least one bearing and is at the rotary axis of the rotary electrically conductive body. The electrical current supplied by a WEDM-generator, is transmitted through a cable and the current feeding device to the wire electrode.

Another aspect is addressed to a rotary electrically conductive body, suitable for use with the inventive current feeding device, for the supply of electrical current to a wire electrode traveling in an electro-erosion machine.

Other aspects, advantageous characteristics and embodiments are explained in the further description.

In one preferred variant, the at least one bearing supporting the rotary electrically conductive body is a jewel bearing which is also known as sapphire bearing. Such jewel bearings are known in particular for their low friction, their long life and resistance to harsh environment. They are typically used in the watchmaking industry, with measuring instruments, in medicine science and more generally in the field of micromechanics. Reference is made to document "Jewel Bearings Solve Light Load Problems" by Paul Baillio, Bird Precision.

Due to the low friction between the jewel and the rotary electrically conductive body and the unilateral coaxial contacting of the brush with said rotary electrically conductive block, the braking torque is minimized. The particles produced by the machining process cannot seriously compromise the bearing function nor compromise the current feeding to the rotary electrically conductive body by means of the brush. The inventive current feeding device is comparably immune to the any deterioration due to such debris, so that the rotation of the rotary electrically conductive body is ensured, providing a consistent current feeding capability over lifetime, and a long service life.

Due to the rotation of the rotary electrically conductive body the circumferential position where the current is fed to the wire changes continuously. Thus the heating is distributed in time and space, and the combined thermo-mechanical stress. The jewel bearing has one or more jewels, with the jewels made of sapphire, ceramic, ruby or other suitable hard material. Advantageously, the jewel which is mounted in a jewel retainer has an at least partially spherical shape. On the other hand a jewel seat is formed on the rotary electrically conductive body to receive said jewel, forming the jewel bearing. The seat has an at least partially spherical shape, i.e. a cup shape, or an at least partially conical shape. The aperture angle of an at least partially conical seat is preferably in the range of 60° to 160°, more preferably in the range from 80° to 120°, typically 90°. The sapphire jewel is an electrical insulator so that there is no current flow through the bearing to the rotary electrically conductive body, and thus no damaging due to electrical erosion.

The rotary electrically conductive body is preferably made of tungsten or other material having a good electrical conductivity and possibly high hardness, providing a high resistance against wear and a suitable material for the jewel bearing. The material of the rotary electrically conductive body is typically tungsten carbide, copper, or an alloy. The rotary electrically conductive body may comprise a hard coat at its periphery. The rotary electrically conductive body is machined with high accuracy. In particular the radial runout of the outer cylindrical surface with respect to the rotatory axis must be minimal, to avoid variation of the wire tension. Also the seat for the jewel and contact surface of a brush must be manufactured accurately and must have low roughness.

The brush is preferably a solid brush. The brush may be a carbon brush, but other materials such as copper, silver, gold, graphite, brass or other excellent conductors or alloys may also be used. Alternatively the brush may be composed of two contacting elements, with a first solid contacting element having a tube shape, and a second inner contacting element being a fiber brush element, or vice-versa. In this way the characteristics of the solid contacting element are combined with the characteristics of a fiber brush contacting element. The fiber brush element may be in principle similar to certain microfiber brushes used for shaft grounding, including conductive filaments such as disclosed in EP1523086A, or the one disclosed in EP2892673A. These known fiber brush elements are made for radial contacting, whereas here the brush would be conceived for axial contacting of the rotary electrically conductive body.

Alternatively the contacting element may be a leaf spring type contact.

As mentioned introductorily with regard to the current feeders comprising a rotary element, it is important that the rotation of the rotating element is constant and reliable. The use of a dedicated motor for the rotation of the current feeders is not desired for several reasons. Thus the rotating element rotates due to the friction of the traveling wire against the rotary electrically conductive body. For this reason the bearing and the current feed to the rotating element must be designed such as to limit the friction, but to still ensure a precise support of the rotary electrically conductive body and safe current transfer. Further, as shown in FIG. 1, the diameter of the rotary electrically conductive body is limited by the available space within the wire guiding head. However the rotary electrically conductive body cannot be made excessively small because it is entrained by the traveling wire, and here the driving torque is proportional to the half diameter of the rotary electrically conductive body, and proportional to the radial force generated by the wire tensioning force $F_W$.

As said, the rotary electrically conductive body is driven by the frictional force $F_F$ which is a tangential force to the rotary electrically conductive body. The frictional force $F_F$ is determined by the contact force $F_N$, which is the force component of the wire tensioning force $F_W$ acting against the current feeder, and by the frictional coefficient $\mu_F$ between the traveling wire and the rotating rotary electrically conductive body; $F_F=F_N*\mu_F$. The force component $F_N$ of the wire tensioning force $F_W$ is typically determined by the deflection angle impressed to the wire electrode which in operation is deflected by the pre-guides. Alternatively or in combination hereto a pressure member can be used to urge the wire against the current feeder, to ensure the required contact force $F_N$.

The rotation of the rotary electrically conductive body is disturbed by the friction of the current feeding brush and the friction of the jewel bearing. The latter is comparably small due the low frictional coefficient $\mu_J$ of the jewel bearing, whereas the braking action of the current feeding brush against the rotary electrically conductive body is not negligible. The braking force of the brush $F_{BB}$ is proportional to the brush spring force $F_S$ urging the brush against the rotary electrically conductive body, and proportional to the frictional coefficient $\mu_B$ of the brush on the rotary electrically conductive body, so that $F_{BB}=F_S*\mu_B$. The breaking force of the jewel bearing $F_{BJ}$ is proportional to the reaction force $F_{RJ}$ which is essentially equivalent to the brush spring force $F_S$, and proportional to the frictional coefficient $\mu_J$ of the jewel on the rotary electrically conductive body, so that $F_{BJ}=F_S*\mu_J$. To achieve a very low frictional coefficient $\mu_J$ the jewel seat is machined with high accuracy and low roughness.

The frictional force $F_F$ generates a driving torque $T_D$, which is determined by the frictional force $F_F$ itself and the radius $r_F$ of the periphery of the rotary electrically conductive body; $T_D=F_F*r_F$. The braking force of the brush $F_{BB}$ and the braking force of the jewel $F_{BJ}$ both generate a braking torque $T_B$, which are determined by the two braking forces $F_{BB}$ and $F_{BJ}$ and the respective contact radius at which they respectively urge against the rotary electrically conductive body, with the contact radius $r_J$ of the jewel being small; in particular smaller than the contact radius $r_B$ of the brush. The contact radius $r_B$ of the brush can be approximated by the half diameter of the brush 80. The braking torque is $T_B=F_{BB}*r_B+F_{BJ}*r_J$.

To achieve a possibly low braking torque $T_B$ the jewel seat and the contact surface of the brush on the rotary electrically conductive body are machined with high accuracy and low roughness, and the diameter of the jewel and, in particular, the diameter of the brush are not made unnecessarily large. In particular the diameter of the brush for the feeding of the current to the rotary electrically conductive body is made as small as possible to achieve a low braking torque $T_B$, and as large as needed to transfer the machining current.

In a first approximation the braking torque component of the jewel side is negligible because of the low frictional coefficient $\mu_J$ and the small contact radius $r_J$. In any case the braking torque under normal conditions must be considerably smaller than the driving torque $T_D$. Preferably, for a reliable operation under normal conditions, a safety margin $FS=T_D/T_B$ of the inventive current feeding device should be $\geq 2$.

This means that all relevant components of the current feeding device must be suitably designed. In particular, the diameter of the rotary electrically conductive body, the diameter of the brush, the geometry and roughness of the seats respectively contact surface of the rotary electrically conductive body, the characteristic and pretension of the brush spring, the deflection angle of the wire determined by the position of the pre-guides with respect to rotary electrically conductive body, the material, size and quality of the components, etc. are to be selected, computed, designed and manufactured such as to achieve the required safety margin for a reliable operation under all working conditions.

A larger diameter of the rotary electrically conductive body ensures a higher lifetime as a consequence of the larger circumference. Further a larger diameter of the rotary electrically conductive body provides a better safety margin FS, because of the lever effect of the radius $r_F$. However the size of the rotary electrically conductive body also determines the size of its enclosure, respectively the size of the wire guiding heads.

The diameter of the rotary electrically conductive body is preferably in the range of 8 to 40 mm, more preferably in the range of 10 to 20 mm, typically 12 mm. The diameter of the contact brush is preferably in the range of 1 to 5 mm, more preferably in the range of 1 to 5 mm typically 3 mm. The spring force is preferably in the range of 0.5 to 5N, typically 3N.

BRIEF DESCRIPTION OF THE DRAWINGS

In order to describe the manner in which advantages and features of the disclosure can be obtained, in the following a more particular description of the principles briefly described above will be rendered by reference to specific embodiments thereof which are illustrated in the appended drawings. These drawings depict only exemplary embodiments of the disclosure and are not therefore to be considered to be limiting of its scope. The principles of the disclosure are described and explained with additional specificity and detail through the use of the accompanying drawings in which.

EXEMPLARY EMBODIMENTS

Figure 1:
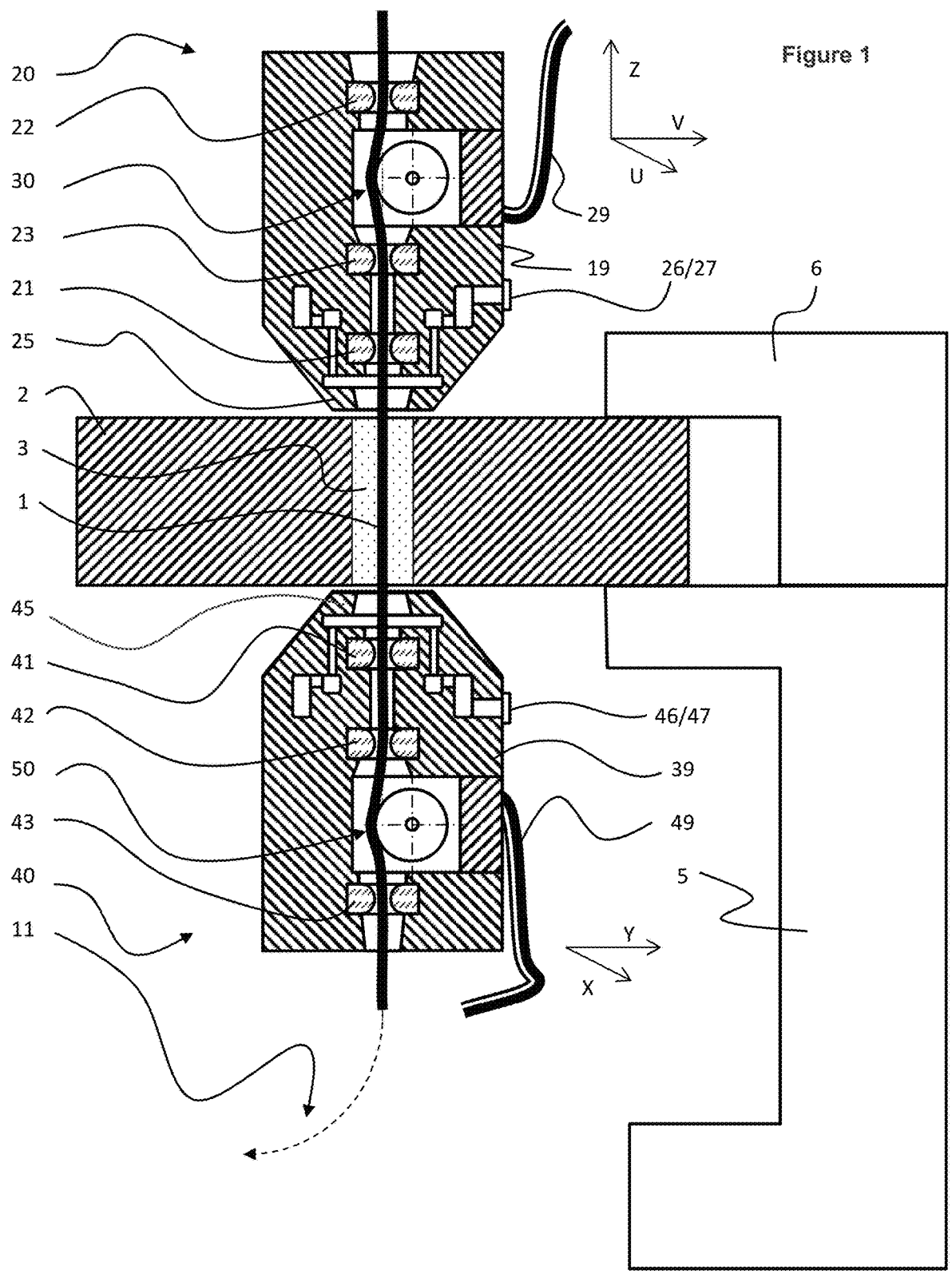
FIG. 1 illustrates a simplified schematic of the working area of a WEDM.

First, the relevant parts of a WEDM according to the present invention are described with reference to FIG. 1, in a very simplified representation. A workpiece 2 having a starting hole 3 is mounted on a stationary table 5 and fixed by means of a clamp 6. The tensioned wire electrode 1 is guided by means of an upper wire guiding head 20 and a lower wire guiding head 40. The upper and the lower wire guiding heads 20, 40 are moveable in parallel plans with respect to the stationary workpiece 2, by means of the U, V axis for the upper head 20, and by means of the X, Y axes for the lower head 40. The upper wire guiding head 20 is further moveable vertically. The upper and lower wire guiding heads comprise main wire guides 21, 41 which are arranged as close as possible to the workpiece. Further each head comprises a pair of pre-guides, that is, the pre-guides 22 and 23 in the upper head, and the pre-guides 42 and 43 in the lower head. Between the pair of pre-guides there is a rotary current feeding device 30 and 50 according the present invention, which is described in detail further down. The rotary current feeding device is mounted such that a rotary electrically conductive body 60 deviates the wire 1 from the straight path between the two preguides 22 and 23.

The upper and lower wire guiding head comprise other elements which are relevant for the operation of the WEDM, including for instance the connections for the current carrying cables 29, 49 which are connected to the current feeding device, and a flushing circuit 26, 46 with respective fluid inlets 27, 47. For ease the upper head body 19 and the lower head body 39 are represented as monolithic pieces, however wire guiding head bodies are generally composed of a plurality of modular parts by which the functional components can be easily mounted and dismounted.

Figure 2:
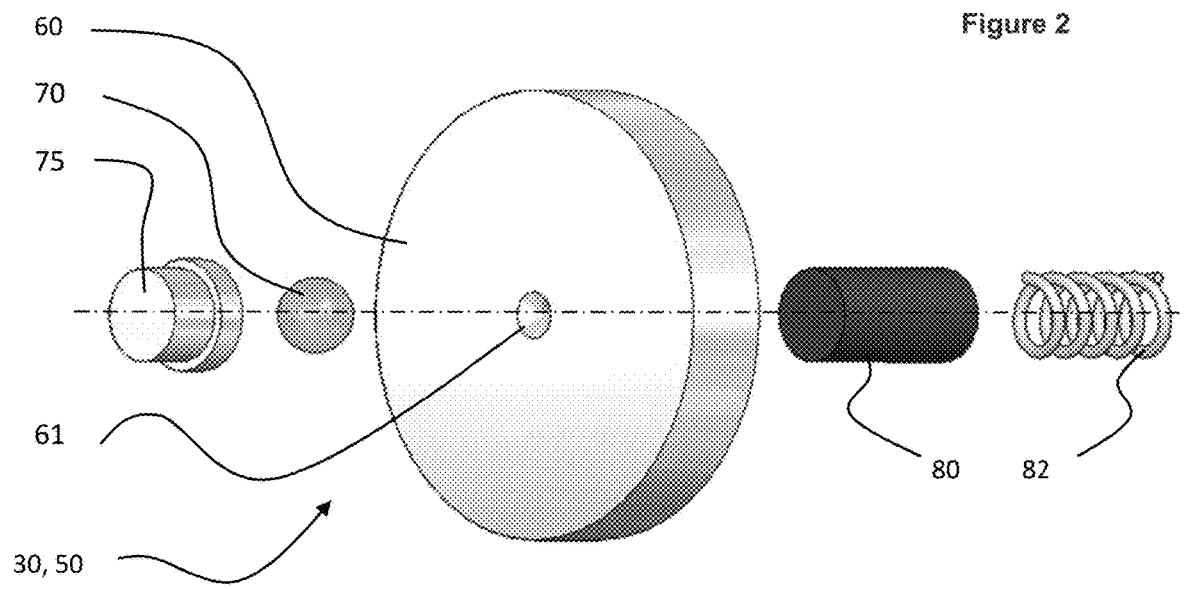
FIG. 2 illustrates an explosion of the main elements of the current feeding device.
Figure 3:
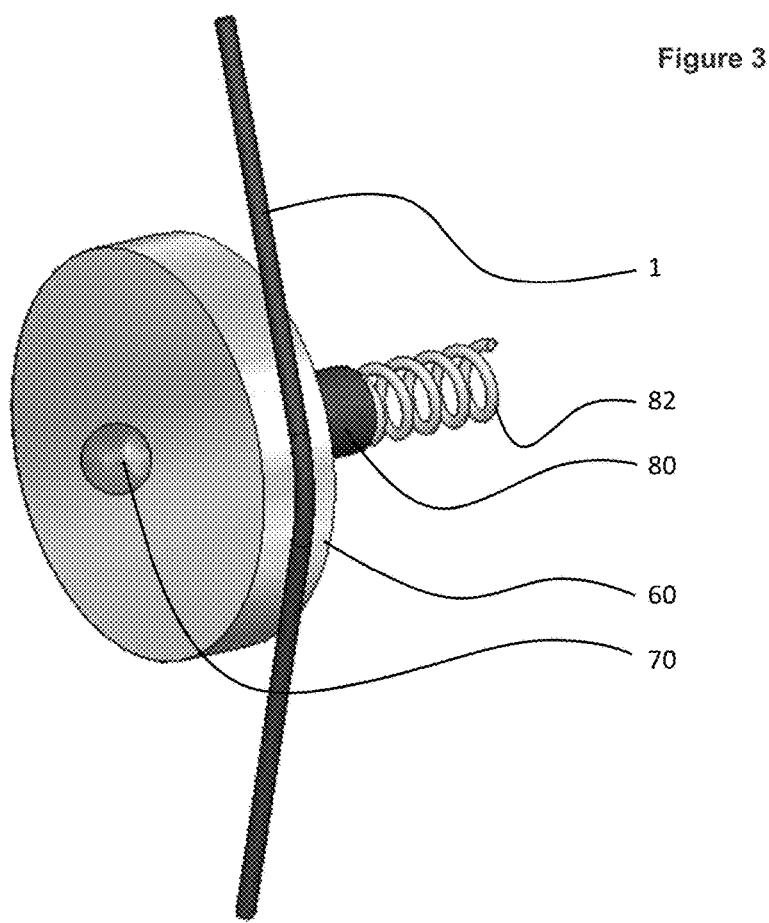
FIG. 3 illustrates an assembly of the main elements of the current feeding device.

FIG. 2 is an explosion of the main elements of the current feeding device. A rotary electrically conductive body 60 comprises a seat 61 formed at its axis, where the seat 61 is designed to complementarily fit a jewel 70 held by a jewel retainer 75, as shown in FIG. 3. On the other side of the electrically conductive body a brush 80 is pressed against the rotary electrically conductive body 60 by means of a brush spring 82. The traveling wire 1 embraces an arc portion of the rotary electrically conductive body 60. Said arc portion is determined by the relative position of the pre-guides with respect to rotary electrically conductive body 60.

Figure 4A:
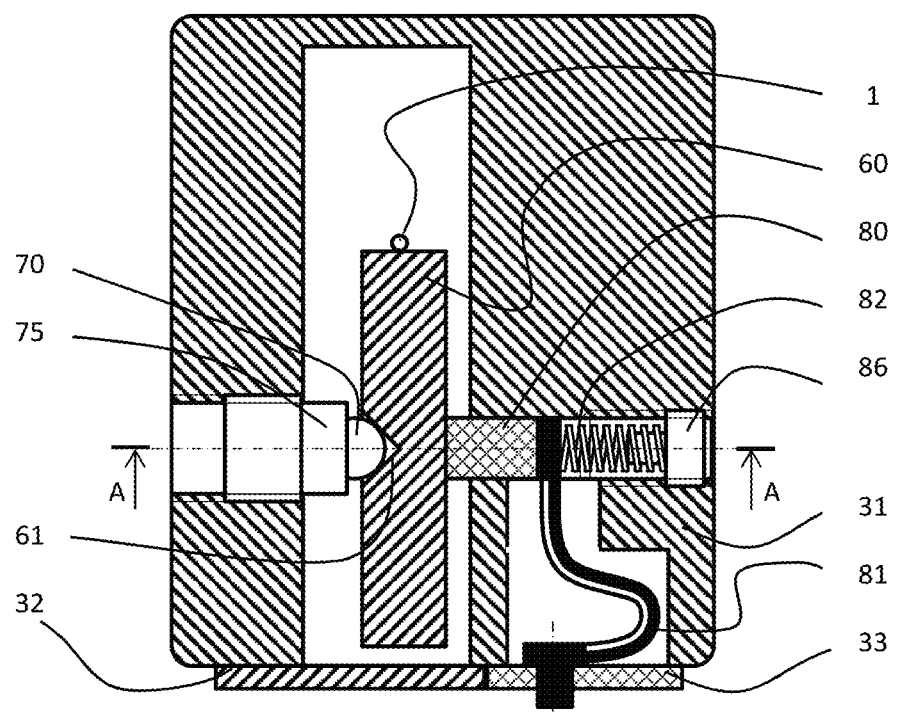
FIG. 4a-b illustrates two cross sections with the main elements of the current feeding device.

The current feeding device according to the invention is directly mounted in the wire guiding head body 19 and 39, or in a suitable current feeding device holder module 31 shown in FIG. 4a,b, which is inserted in the respective wire guiding head 20 and 40. As shown in FIG. 4a, a contact braid 81 serving to transmit the machining current to the brush is mounted at the rear end of the brush 80.

The jewel 70 is firmly held by the jewel retainer 75 and mounted on the holder module 31. The rotary electrically conductive body 60 is borne at one side by said jewel 70 and on the other side by the brush 80. As shown in FIG. 2, jewel, seat, rotary electrically conductive body and brush are positioned along the same axis. The jewel 70 paired with the seat 61 blocks two translational degree of freedom (DoF) (Z,Y). The third translational DoF (X) and two rotational DoF are blocked by the brush 80 (B,C). The last DoF (A), around the axis of the rotary electrically conductive body 60 is free, restricted only by friction. In summary, the jewel bearing and the brush current feeding contact support the rotary electrically conductive body, blocking all DoF, except the rotation of the rotary electrically conductive body around its own rotary axis. The brush current feeding contact represents the counter-bearing to the jewel bearing.

Figure 4B:
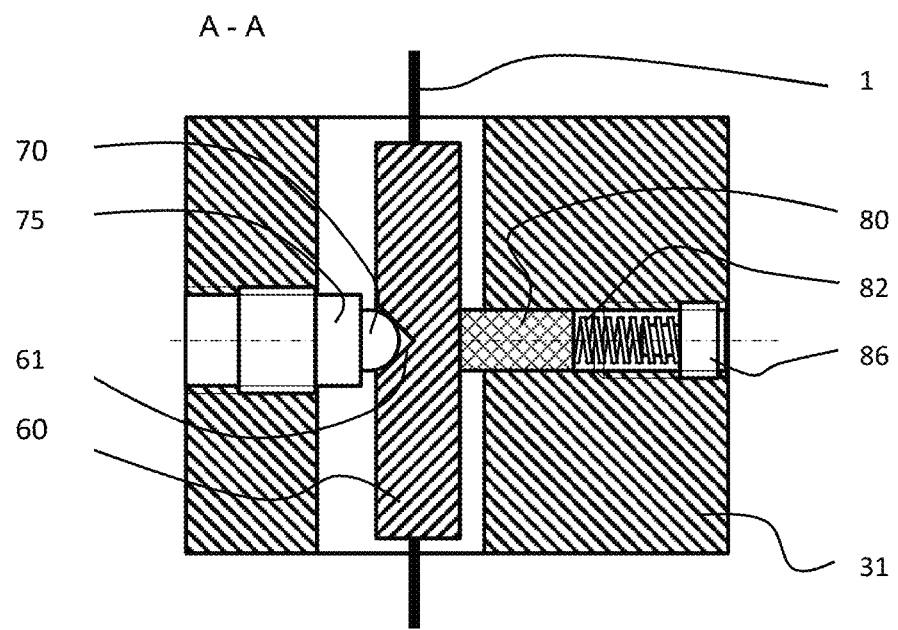

As shown in FIG. 4 the jewel retainer 75 comprises a threaded section or an arrester by which the jewel can be positioned axially at the desired position. In this way the axial position of the rotary electrically conductive body 60 can be adjusted, and if needed repositioned to use an unworn region of its circumference. Alternatively the entire current feeding device holder module 31 can be designed to be guided and laterally adjustable in the wire guiding head for instance by means of a screw, to adjust the position of the wire 1 with respect to the rotary electrically conductive body 60.

Figure 5A:
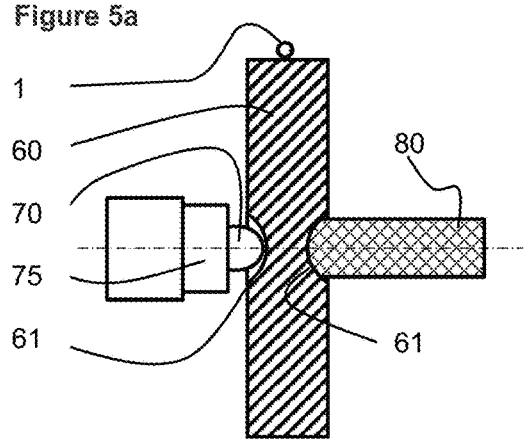
FIG. 5a-f illustrates six embodiments of the rotary electrically conductive body, bearing and brush.
Figure 5B:
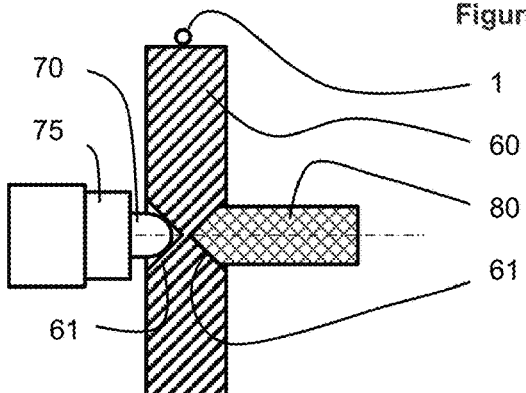

The FIGS. 5a to 5f, 6a, 6b and 7 show a variety of possible configurations and constitutions of the rotary current feeding device according to the present invention. FIG. 5a shows an embodiment with a rotary electrically conductive body 60 having the shape of a disk, i.e. a thin cylinder. However the body 60 may be made thicker, so that it can be displaced axially with respect to the traveling wire 1, whereby the contact position changes and the lifetime is prolonged.

Figure 5C:
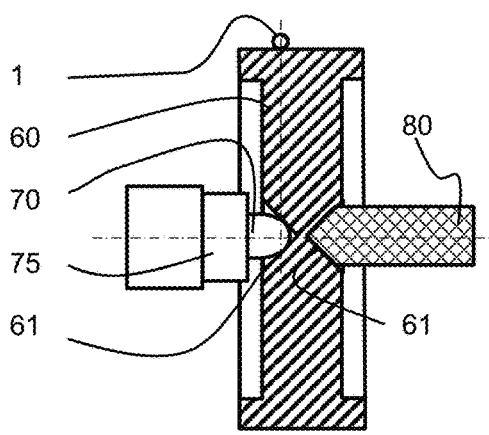

The bodies 60 of the embodiments of FIGS. 5c,d,e,f and 6b have an enlarged circumferential surface, which protrudes laterally over the support point of the jewel bearing. The contact position of the traveling wire 1 on the rotary electrically conductive body 60 is set such as to minimize an offset of the wire with respect to the support point of said body 60 on the jewel bearing 70, as indicated by the dash-dotted line. The advantage of this embodiment is that there is no or only a minimal torsional moment, so that the load on the brush is essentially axial.

FIGS. 5a, b, c, and e show the embodiments, in which the rotary electrically conductive bodies 60 are fully symmetrical, including the seat 61, so that the working position of the bodies 60 can be inverted to set a new contact position of the wire 1, without any further adjustment of the jewel retainer 75. Opposite to the embodiments in FIGS. 5d,f and 6a,b, here the contact surface of the brush 80 with the rotary electrically conductive body is not flat. With these embodiments the brush is urged against the seat 61, thus the tip of the brush has the same shape of the seat 61. The tip of a new brush is already shaped to match with the seat, and maintains the same shape by wearing against the seat 61.

Figure 5D:
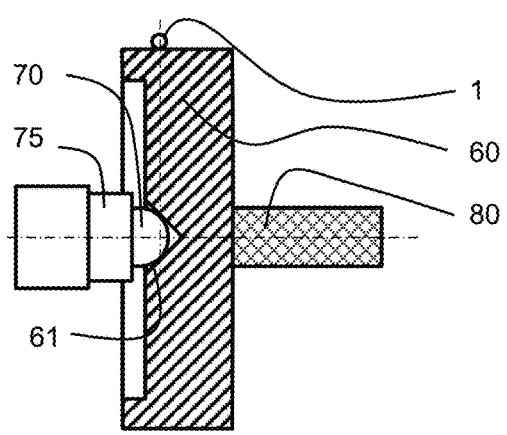
Figure 5E:
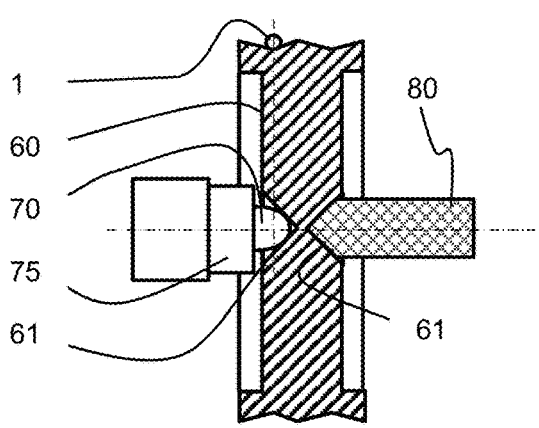

FIGS. 5d, f, 6a, and b show the further embodiments, in which the rotary electrically conductive bodies 60 are not symmetrical, which means that the working position cannot be inverted. Here the contact surface of the brush 80 and rotary electrically conductive body 60 is generally flat.

FIG. 5a shows a concave spherical seat 61, whereas the FIGS. 5b to 5f show tapered seats 61. In these embodiments the active section of the jewel 70 has a spherical or an oval shape, however it may have other shapes, for instance a conical shape with a small jewel radius at the top.

The rotary electrically conductive bodies 60 in the embodiments shown in FIGS. 5a to 5e and 6a, b have a flat, outer cylindrical surface, so that the axial contact position of the wire 1 on the rotary electrically conductive body 60 is where the lateral forces are in equilibrium. Thus here the position of the tensioned wire 1 is determined by the relative position of the pre-guides. The embodiment shown in FIG. 5e has V-grooves with a large aperture by which the tensioned wire 1 is guided laterally; this version is symmetric thus it can be inverted. The embodiment at FIG. 7 includes a V-groove with a narrow angle; the narrow angle increases the friction of the wire 1 with the rotary electrically conductive body 60, because the forge components of the contact force $F_N$ are larger than the contact force $F_N$ itself, so that the entrainment and thus reliability of rotation of the body 60 is enhanced.

Figure 5F:
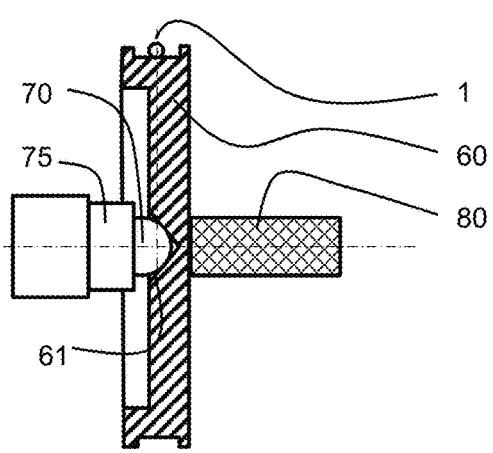

The rotary electrically conductive bodies 60 in the embodiments shown in FIG. 5f has rims at both sides of the cylindrical surface, by which the tensioned wire 1 cannot drop from the body 60.

The bearing is preferably formed by one jewel 70 which is designed to match the shape of the corresponding seat 61 formed at the axis of the rotary electrically conductive body 60, as shown for example in FIG. 5d. The seat 61 formed to receive said jewel 70 is typically a recessed concave seat or a recessed tapered seat.

Figure 6A:
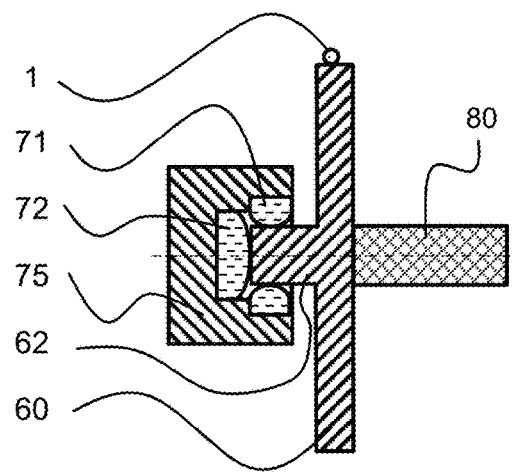
FIG. 6a-b illustrates two further embodiments of the rotary electrically conductive body, bearing and brush.
Figure 6B:
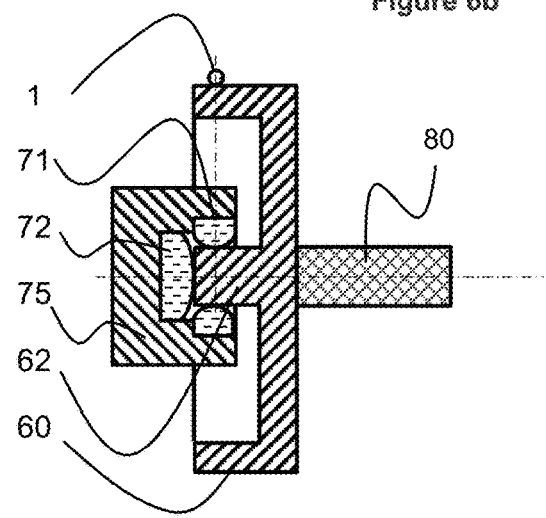

The FIGS. 6a and 6b show two other embodiments, in which the rotary electrically conductive body 60 comprises a shaft-like support pin 62, which is paired with jewels. Here the jewel bearing comprises said support pin 62, an annular jewel 71 i.e. a radial bearing which bears the reaction of the contact force $F_N$ ($F_N$ is the force component of the wire tensioning force $F_W$ acting radially against the current feeder), and a top bearing i.e. an axial bearing which bears the reaction of the brush spring. Again, the rotary electrically conductive body 60 according to FIG. 6b has an enlarged circumferential surface, which protrudes laterally, and by which the offset between the contact force $F_N$ and the reaction force of the annular jewel 71 can be substantially reduced or zeroed.

As shown in FIGS. 4a, and b the progressive wearing of the brush 80 is compensated by the spring 85 which presses the brush against the rotary electrically conductive body 60. A threaded pin 86 serves to adjust the position of the brush spring and to set the spring force. The threaded pin 86 comprises a cylindrical guiding portion which serves to guide the brush spring 85. The length of the cylindrical guiding portion is designed such that it touches the brush 80 when the maximum allowed brush spring force is reached. The brush spring force is easily set, for instance by completely closing the threaded pin 86, and then releasing by opening by a quarter turn. In this way the brush spring force does not exceed the maximum value and the rotary electrically conductive body 60 is not braked.

The current feeding device according the invention may be constituted as a module which can be inserted in the upper, respectively the lower wire guiding. By such modularity one may use another module when needed, with a conventional sliding current feeder. For instance it may be preferable to use a rotary current feeding device with fine to medium wires, whereas it may be advantageous to use a sliding feeder with medium to large wire electrodes and rather high machining currents.

Figure 7:
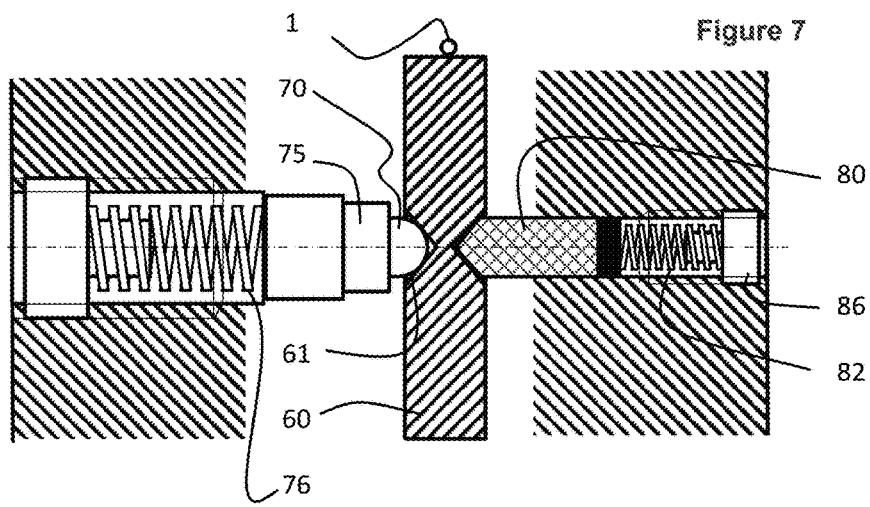
FIG. 7 illustrates a further embodiment of the rotary electrically conductive body, bearing and brush.

In another embodiment according to FIG. 7, the jewel retainer 75 is precisely guided such that it can slide axially and is pressed against the rotary electrically conductive body 60 by means of a jewel retainer spring 76. On the other side, the brush 80 is pressed against the rotary electrically conductive body 60 by means of the brush spring 82. In operation the brush 80 wears slowly, and the brush 80 is still presses against the body due to the force exerted by the brush spring 82. However, due to the wearing of the brush the position of the rotary electrically conductive body 60 changes progressively in the axial direction, so that also the contact position of the traveling wire 1 with the rotary electrically conductive body 60 changes progressively and automatically. In this way the rotary electrically conductive body 60 is uniformly and efficiently used, and the lifetime is substantially increased.

In a further embodiment, the wire electrode 1 is pinched between the rotary electrically conductive body 60 and a pressure roller (not shown), so that the wire electrode travels between said rotary electrically conductive body and said pressure roller. In this way the wire electrode is forced against the rotary electrically conductive body 60. This pressure roller may be either an electrically conductive roller contributing to the current feeding, or a simple roller which increases the mechanical friction between the wire electrode 1 and the rotary electrically conductive body 60.

The invention claimed is:

1. A current feeding device for the supply of electrical current to a wire electrode traveling in an electro-erosion machine during the machining operation, the current feeding device comprising:
    a rotary electrically conductive body which is in contact with the wire electrode;
    at least one bearing for supporting the rotary electrically conductive body at one side;
    a brush directly electrically contacting the rotary electrically conductive body and for supporting the rotary electrically conductive body at another side of the body and opposite to the bearing,
    the brush being concentric with a rotary axis of the rotary electrically conductive body and supporting the rotary electrically conductive body at the rotary axis.

2. A current feeding device according claim 1, wherein the at least one bearing is a jewel bearing.

3. A current feeding device according claim 2, wherein the jewel bearing has an at least partially spherical or an at least partially conical shape.

4. A current feeding device according to claim 1, wherein the rotary electrically conductive body comprises a seat at one or both sides of the rotary axis of the rotary electrically conductive body.

5. A current feeding device according claim 4, wherein the seat of the rotary electrically conductive body has an at least partially spherical or an at least partially conical shape.

6. A current feeding device according to claim 1, wherein the jewel is held by a jewel retainer that is configured so that the axial position of said jewel retainer is adjustable.

7. A current feeding device according to claim 1, wherein a jewel retainer is urged against the rotary electrically conductive body by a jewel retainer spring.

8. A current feeding device according to claim 1, wherein the rotary electrically conductive body has an enlarged circumferential surface which protrudes laterally over the support point of the jewel bearing.

9. A current feeding device according to claim 1, wherein the rotary electrically conductive body has a diameter, which is in the range of 8 to 30 mm.

10. A current feeding device according to claim 1, wherein machining current is transmitted to the rotary electrically conductive body by means of a brush contact having a diameter, which is in the range of 1 to 5 mm.

11. A rotary electrically conductive body for use with a current feeding device according to claim 1, wherein the rotary electrically conductive body has a cylindrical shape and comprises an essentially cylindrical wire running surface and one or two seats at the rotary axis for receiving a jewel and/or the brush.

12. The rotary electrically conductive body according to claim 11, wherein the rotary electrically conductive body, bearing and brush are configured symmetrically.

13. A current feeding device for the supply of electrical current to a wire electrode traveling in an electro-erosion machine during the machining operation, the current feeding device comprising:
- a rotary electrically conductive body which is in contact about its rim with the wire electrode;
- at least one bearing for supporting the rotary electrically conductive body at one side;
- a brush for electrically contacting the rotary electrically conductive body and for supporting the rotary electrically conductive body at another side of the body and opposite to the bearing,
- the brush and bearing being at a rotary axis of the rotary electrically conductive body; and
- the bearing and brush being configured so that the electrically conductive body rotates, without the assistance of a motor, as the wire electrode travels about the rim to thereby present new rim surfaces to further portions of the wire electrode.

* * * * *